United States Patent
Kretzler et al.

(10) Patent No.: US 8,502,705 B2
(45) Date of Patent: Aug. 6, 2013

(54) HYBRID KEYPAD INCLUDING FULL TRAVEL KEYS AND MINIMAL TRAVEL KEYS

(75) Inventors: Randal Scott Kretzler, Austin, TX (US); Timothy Martin Weston, Cedar Park, TX (US)

(73) Assignee: Dresser, Inc., Addison, TX (US)

( * ) Notice: Subject to any disclaimer, the term of this patent is extended or adjusted under 35 U.S.C. 154(b) by 1013 days.

(21) Appl. No.: 11/823,646

(22) Filed: Jun. 28, 2007

(65) Prior Publication Data
US 2009/0002202 A1    Jan. 1, 2009

(51) Int. Cl.
*H03K 17/94* (2006.01)

(52) U.S. Cl.
USPC ............................................. 341/22; 400/488

(58) Field of Classification Search
USPC .................. 141/98; 341/20–23; 400/488
See application file for complete search history.

(56) References Cited

U.S. PATENT DOCUMENTS

| | | | |
|---|---|---|---|
| 5,386,106 A | | 1/1995 | Kumar |
| 5,674,018 A | * | 10/1997 | Kaufman et al. ............. 400/473 |
| 5,808,922 A | | 9/1998 | Martinez et al. |
| 6,005,496 A | * | 12/1999 | Hargreaves et al. ............ 341/22 |
| 6,006,775 A | | 12/1999 | Negley, III |
| 6,041,965 A | | 3/2000 | Smith |
| 6,098,879 A | | 8/2000 | Terranova |
| 6,112,981 A | | 9/2000 | McCall |
| 6,182,893 B1 | * | 2/2001 | Greene et al. ................. 235/380 |
| 6,321,984 B1 | | 11/2001 | McCall et al. |
| 6,573,884 B1 | * | 6/2003 | Kinzie .......................... 345/156 |
| 6,941,274 B1 | | 9/2005 | Ramachandran et al. |
| 2002/0075108 A1 | | 6/2002 | Ward et al. |
| 2003/0106934 A1 | | 6/2003 | McCall et al. |
| 2003/0130891 A1 | | 7/2003 | Jacobs |
| 2004/0010711 A1 | * | 1/2004 | Tang et al. .................... 713/201 |
| 2004/0016474 A1 | | 1/2004 | Todd |
| 2005/0066186 A1 | * | 3/2005 | Gentle et al. .................. 713/193 |
| 2006/0180450 A1 | * | 8/2006 | Clark et al. ................... 200/333 |
| 2006/0278715 A1 | * | 12/2006 | Hamilton et al. ........ 235/472.01 |

OTHER PUBLICATIONS

International Search Report and Written Opinion for PCT/US2008/065789, Nov. 13, 2009, 11 pages.

* cited by examiner

*Primary Examiner* — Brian Zimmerman
*Assistant Examiner* — An T Nguyen
(74) *Attorney, Agent, or Firm* — Hiscock & Barclay LLP

(57) ABSTRACT

A device for entering information securely in a customer transaction is described. The device may include a keypad comprising a set of full travel keys for transmitting a first set of data and a set of minimal travel keys for transmitting a second set of data. A subset of the full travel keys may be operable to receive numerical entries, and a subset of the minimal travel keys may be customized to perform one or more nonnumeric functions. A controller is connected to and receives data from one or more components of the keypad. The device may be used in a fuel dispenser system or another environment where a customer transaction occurs.

10 Claims, 3 Drawing Sheets

HYBRID KEYPAD INCLUDING FULL TRAVEL KEYS AND MINIMAL TRAVEL KEYS

TECHNICAL FIELD

This disclosure relates to keypads with full travel keys and minimal travel keys and, more particularly, to the use of such keypads in a fuel dispenser system.

BACKGROUND

In recent years, several factors have increased the importance of providing data input devices to facilitate commercial transactions. Consumers increasingly rely on alternatives to cash or checks, such as credit cards or debit cards, to purchase goods and services. Businesses increasingly rely on devices such as magnetic strip readers, bar code readers, and keypads to gather information from consumers during the course of a transaction. Such devices can prove particularly helpful in environments where consumers do not interact with a representative of a business or where consumers find using cash or checks inconvenient, such as a fuel dispensing environment. The effective use of such devices often requires the customer to enter personal information or to make transaction-related entries through one or more keypads.

SUMMARY

This disclosure provides for a device for entering information securely in a customer transaction. The device may have at least one keypad comprising a set of full travel keys for transmitting a first set of data, wherein all or a subset of the full travel keys may be operable to receive numerical entries. Likewise, the keypad may have a set of minimal travel keys for transmitting a second set of data, wherein a subset of the minimal travel keys may be customized to perform at least one nonnumeric function. As used herein, the term "keypad" may refer to a single keypad, a plurality of keypads, and/or a set of keypads. The term "full travel keys" refers to keys that have a total key travel of 2.5 mm or more. The term "minimal travel keys" refers to keys that have a total key travel of less than 2.5 mm, and may include membrane keys as well as keys using a variety of technologies, including metal dome switch, push gate (Duraswitch), capacitive, and Hall Effect technologies. The device also has a controller connected to the keypad and operable to receive the first set of data and the second set of data. The first set of data may be encrypted by an encryption device and sent to the controller in an encrypted format. The second set of data may be received by the controller in an unencrypted format.

Certain implementations may have at least one keypad containing at least one key operable to authorize a step of a transaction and, similarly, at least one key operable to cancel a transaction. The keypad may also have at least one language selection key. It will be understood that a variety of other embodiments are also possible. For instance, if one or more minimal travel keys are customized, they may be customized by having a graphic overlay placed over or next to the minimal travel keys intended to be customized. The first set of data captured may comprise a personal identification number and/or a zip code. The second set of data may comprise a selection of a payment option of debit or credit and/or a selection of a fuel grade.

Alternative embodiments may couple the device described above with a fuel dispenser system. A fuel dispenser system may have a nozzle for dispensing the fuel, a controller in communication with the nozzle for selectively causing the nozzle to dispense the fuel, a reader connected to the controller for reading data provided by a user and transferring the data to the controller, and a set of keypads connected to the controller for receiving at least one keypad entry entered by a user, comprising at least one full travel key and at least one minimal travel key. In this system, when the controller receives the data and the keypad entry, it allows the nozzle to dispense the fuel as part of a transaction. Certain embodiments may have a single keypad, rather than multiple keypads, coupled to the fuel dispenser system.

The details of these and other aspects and embodiments of the disclosure are set forth in the accompanying drawings and the description below. For example, in embodiments that couple the device with a fuel dispenser system, keypad entries made on one or more of the full travel keys may be encrypted by an encryption device before being received by the controller in an encrypted format. Such keypad entries may include numerical values and comprise a personal identification number. Embodiments may also have one or more minimal travel keys customized to perform at least one nonnumeric function, customization which may be accomplished by placing one or more graphic overlay over or next to the subset of the minimal travel keys intended to be customized. Functions performed by the minimal travel keys may include the authorization of a step of a transaction, the cancellation of a transaction, the selection of a payment option of debit or credit, and/or the selection of a fuel grade. Different embodiments permit a variety of keypad configurations. Other features, objects, and advantages of the various embodiments will be apparent from the description, drawings, and claims.

DETAILED DESCRIPTION

Figure 1:
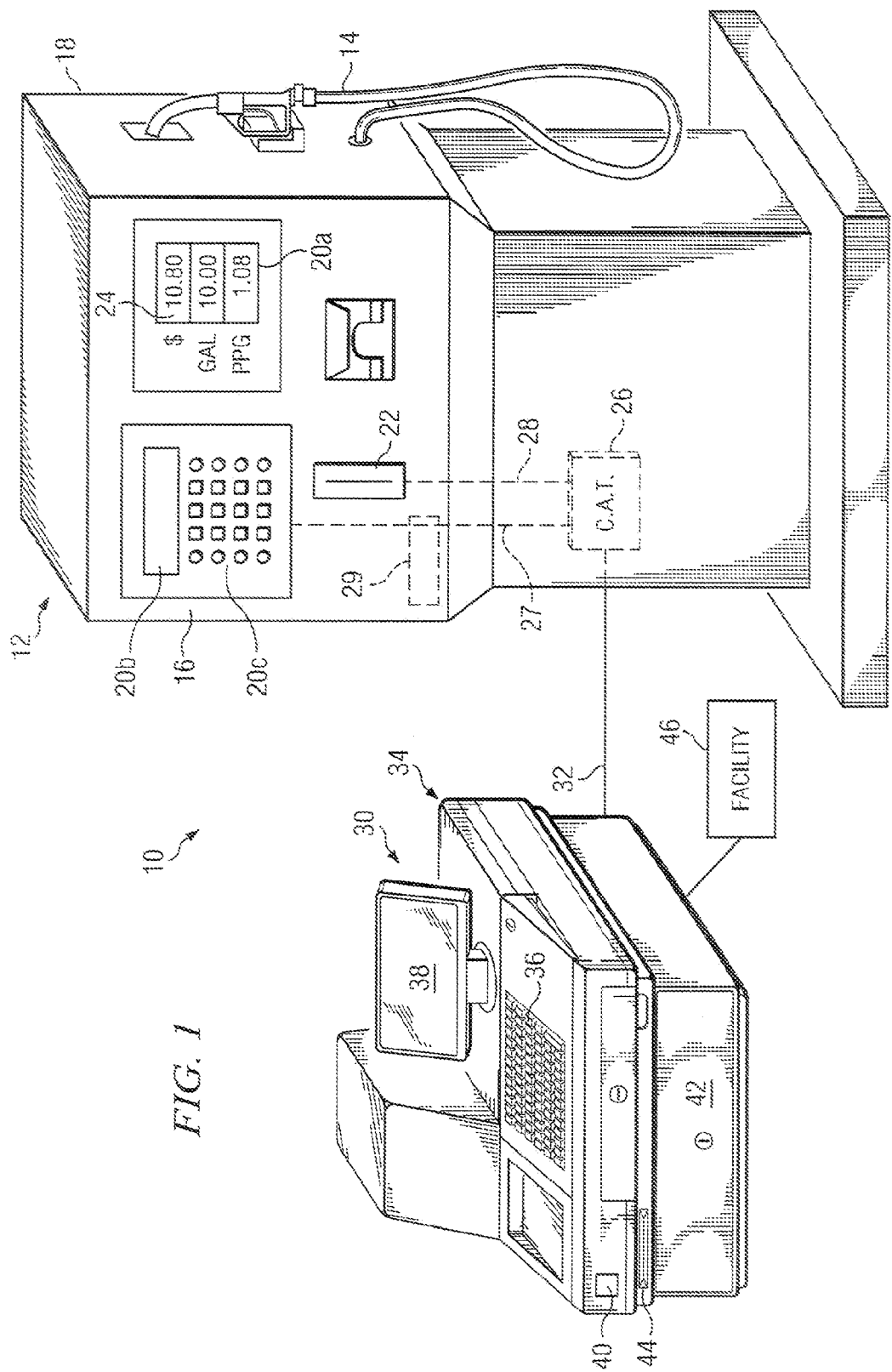
FIG. 1 is a diagram of one embodiment of a fuel dispenser system having a hybrid keypad.

In FIG. 1, reference numeral 10 designates a fuel dispenser system embodying features of one embodiment of the present invention. The fuel dispenser system 10 includes a fuel dispenser 12, which contains many elements of a conventional fuel dispenser such as a fuel nozzle 14 connected to a fuel supply (not shown). The dispenser 12 has a front side 16 and a back side 18. In the following description, only the front side 16 will be discussed for ease of description. However, the features described herein may also be applied on the back side 18, thereby allowing the dispenser to be operated by two customers at the same time.

The front side 16 houses conventional graphics displays 20a, 20b, keypad 20c, and a reader device 22, which may read bar code or magnetic data as preferred. The graphics displays 20a, 20b each include a conventional LCD panel for showing text and numerals, such as a price 24 that corresponds to an amount of fuel dispensed, or other customer-related messages. As used herein, the term "keypad" can refer to a single keypad, a plurality of keypads, and/or a set of keypads.

Keypad 20c includes full travel keys that may permit the entry of alphanumeric data as well as minimal travel keys that may provide customizable functions. The term "full travel keys" refers to keys that have a total key travel of 2.5 mm or more. Full travel keys typically provide tactile feedback and commonly have a total key travel of approximately 4 mm. The term "minimal travel keys" refers to keys that have a total key travel of less than 2.5 mm, and may include "membrane keys" as well as keys using a variety of technologies, including metal dome switch, push gate (Duraswitch), capacitive, and Hall Effect technologies. Such keys commonly have a total key travel of less than 0.6 mm. "Membrane keys" are substantially flat rather than consisting of separate, moving parts; consequently, they generally provide relatively little tactile feedback. They may be activated in a variety of ways, such as by depression, touch, pressure, or heat. Details concerning membrane keys are well known in the art and will not be described further.

Keypad 20c is connected to a controller 26 through a cable 27 and is described in further detail in reference to FIGS. 2A-2D. The reader device 22 includes magnetic strip reading circuitry connected to a controller 26 through a cable 28 such as an RS232 serial data bus. For the sake of example, the controller 26 controls the reader device 22, keypad 20c, and other functions of the dispenser 12, and may be a controller that includes a Customer Activated Terminal ("CAT") computer produced by the Wayne division of Dresser, Inc. In FIG. 1, both the controller 26 and the cable 28 are conventional devices housed inside the dispenser 12. It is understood that the reader device 22 and controller 26 continue to provide conventional magnetic strip reading functions in addition to the functions and features herein described.

The controller 26 is also connected to a computing center 30 through a bus 32. In one embodiment, the computing center 30 is remotely located inside a store (not shown) or at an unattended site where it may be readily accessed. The computing center 30 includes a point-of-sale ("POS") controller 34. The POS controller 34 includes many features of a conventional electronic cash register, such as a keyboard 36, a display 38, a database 40, a cash drawer 42, and an internal card reader device 44, for use by an operator in charge of overseeing and maintaining the dispenser system 10. It is understood that the database 40 may be remote, and it is shown with the POS 34 for ease of description. Also, the POS controller 34 may be in communication with other systems or devices, such as a carwash facility 46.

The database 40 contains a collection of records pertaining to its customers. For example, the store may be a member-oriented retail outlet, and a record for each customer indicates that the customer is a member and a "level" of benefits or privileges that the customer may receive. One level may indicate a first discount to the customer of the goods he purchases while another level may indicate a second discount. The POS controller 34 can thereby receive information from the controller 26, access the database 40, and return control codes which indicate, for example, membership status, level of benefits, or an "OK" signal to allow fuel dispensing.

Figure 2A:
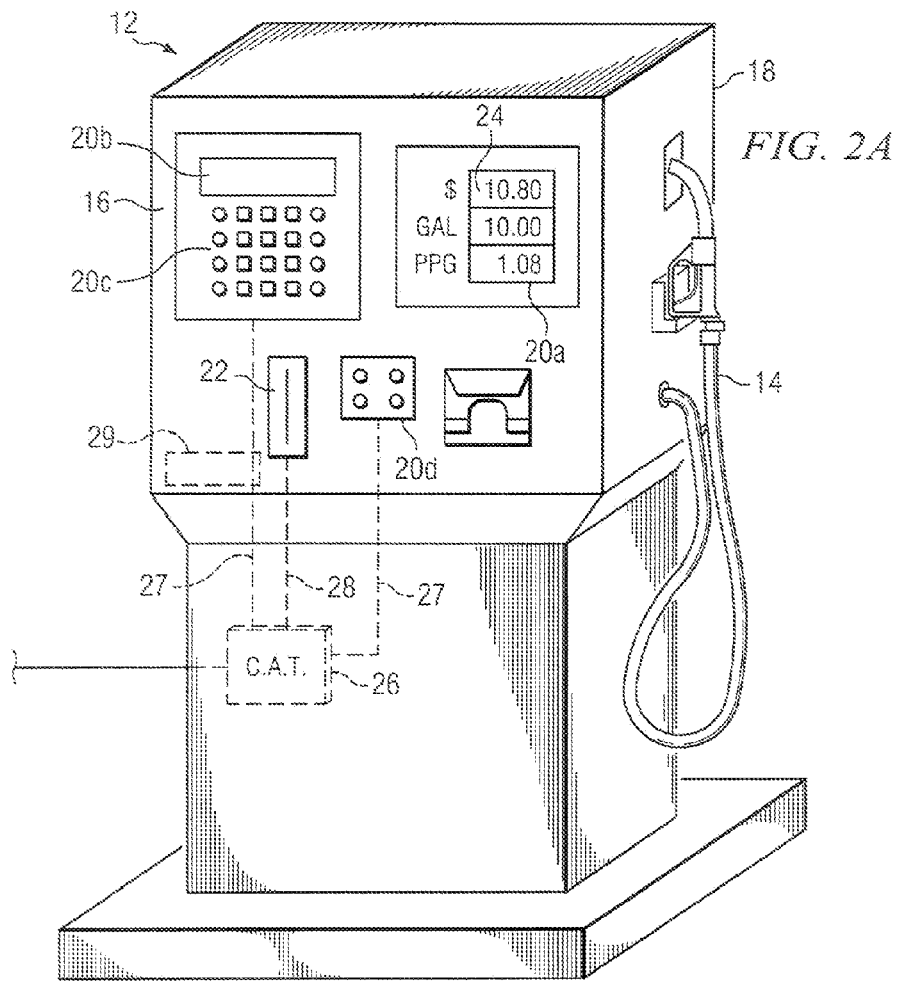
FIGS. 2A-2D illustrate various embodiments of hybrid keypads in more detail.

FIGS. 2A-2D illustrate alternative embodiments of the keypad 20c containing full-travel keys and minimal travel keys that may be used in a fuel dispenser system. These figures are not meant to limit the keypad 20c of this patent to any particular configuration, but are instead offered as illustrations of a variety of possible configurations. Keypad 20d, shown in the alternate configuration of FIG. 2A, is one of several alternative keypad embodiments contemplated by this disclosure and it may have any or all of the features and characteristics described with respect to keypad 20c throughout this disclosure.

A number of features may be shared by the various embodiments of keypad 20c. It will be understood that each keypad 20c used in the fuel dispenser system is connected, either directly or indirectly, to the controller 26, typically by at least one cable 27, through which controller 26 receives data from the full travel keys and minimal travel keys contained on keypad 20c, as described in further detail below. Moreover, each keypad 20c may be used in conjunction with one or more keypads 20c of the same keypad embodiment or of a different keypad embodiment. For each keypad 20c, a subset of the set of full travel keys contained thereon may represent alphanumeric characters and may be operable to capture numerical values such as one or more personal identification numbers, zip codes, payment authorization limits, as well as any other information that facilitates a retail transaction, such as a fuel dispensing transaction. This subset of full travel keys may consist of all or any grouping of full travel keys on the keypad, as long as the grouping has at least one full travel key in it. Such full travel keys may also permit, without limitation, the authorization of a transaction or step of a transaction; the cancellation of a transaction; the correction of a keypad entry made by a user; the clearing of one or more keypad entries made by a user; the selection of a language; the selection of a payment option such as debit, credit, cash, or check; the selection of whether to pay inside or outside; the selection of an additional service such as a carwash; the selection of a fuel grade; the selection by the user indicating a desire for help or assistance; a method for communicating with an operator located remotely, within a nearby store, or elsewhere; a method for indicating an emergency; a method for indicating "yes;" a method for indicating "no;" and a method for producing a transaction receipt. Data associated with entries made on full-travel keys may be encrypted, and is typically encrypted, by an encryption device 29 upon entry or upon transmission of the data from the keypad to another device, such as controller 26, computing center 30, or facility 46. The encryption device may be connected to one or more members of the set of full travel keys, one or more members of the set of minimal travel keys, and/or one or more members of the set of keypads. Moreover, the encryption device may be an integrated component of the keypad or may be substantially separate from the keypad, as preferred.

Moreover, for each keypad 20c, a subset of the set of minimal travel keys contained thereon may be customized to perform a variety of functions, whether numeric or nonnumeric, for different companies. This subset of minimal travel keys may consist of all or any grouping of minimal travel keys on the keypad, as long as the grouping has at least one minimal travel key in it. The customizable functions may include, without limitation, the authorization of a transaction or a step of a transaction; the cancellation of a transaction; the correction of a keypad entry made by a user; the clearing of one or more keypad entries made by a user; the selection of a language; the selection of a payment option such as debit, credit, cash, or check; the selection of whether to pay inside or outside; the selection of an additional service such as a carwash; the selection of a fuel grade; the selection by the user indicating a desire for help or assistance; a method for communicating with an operator located remotely, within a nearby store, or elsewhere; a method for indicating an emergency; a method for indicating "yes;" a method for indicating "no;" a method for producing a transaction receipt; and any other customizable function that a company may wish to offer. Such customization may be achieved by placing one or more graphic overlays substantially next to the one or more minimal travel keys intended to be customized, or by mapping the minimal travel keys to customized soft keys. As used herein, "substantially next to" shall mean "over" or "next to." Data associated with entries made on the minimal travel keys may be encrypted by an encryption device upon entry or upon the transmission of the data from the keypad to another device, such as controller 26, computing center 30, or facility 46. However, data associated with entries made on the minimal travel keys does not need to be encrypted. Returning to FIGS. 2A-2D, FIG. 2A shows an embodiment where multiple keypads are used in the fuel dispenser system and where one or more keypads contain either full travel keys or minimal travel keys, but not both. Each of the keypads in FIG. 2A may be one of the keypad embodiments shown in FIGS. 2B-2D, or may be a different embodiment. When a set of keypads is used in a fuel dispenser system, an embodiment may also have a subset of the keypads having full travel keys and a subset of the keypads having minimal travel keys. This subset of keypads may consist of all or any grouping of keypads on the fuel dispenser system, as long as the grouping has at least one keypad in it.

Figure 2B:
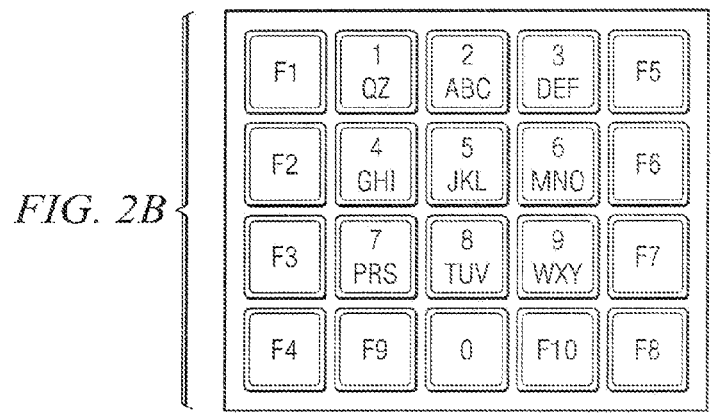
Figure 2C:
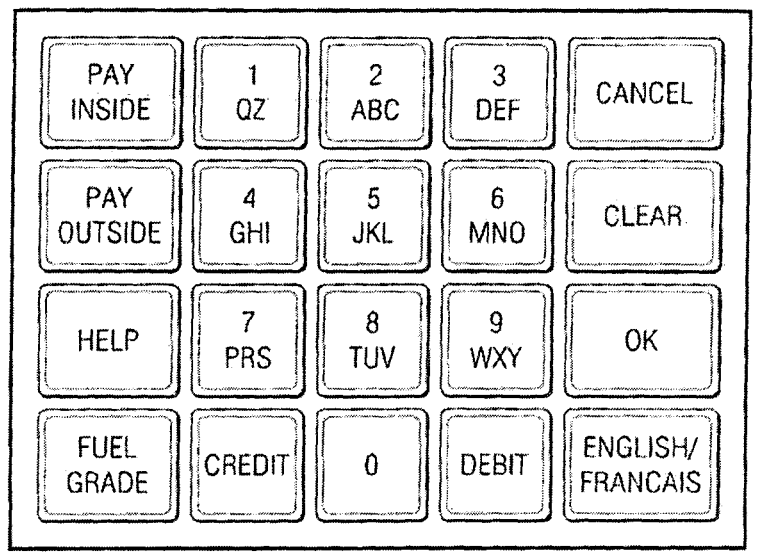
Figure 2D:
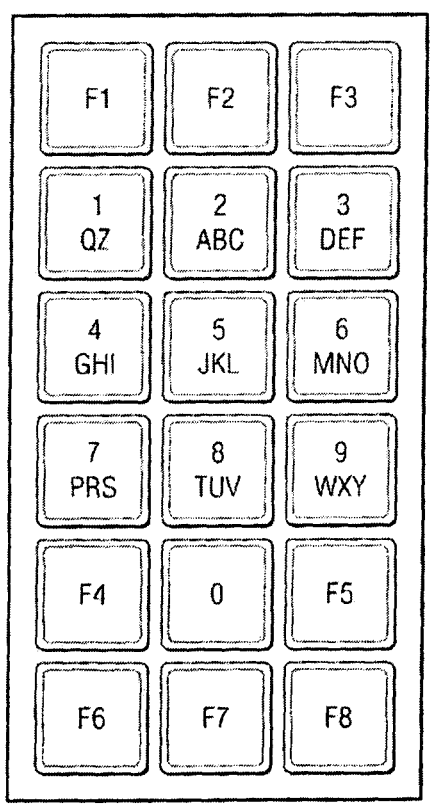

FIG. 2B shows a single hybrid keypad having four rows and five columns of keys. In the figure, the outside columns of keys contain minimal travel keys and the inner three columns contain full travel keys. It is also envisioned that the keys below the numerals "7" and "9" could be minimal travel keys rather than full travel keys. Moreover, another embodiment could include minimal travel keys in any of the five columns, such as having an outer column consist partially or entirely of minimal travel keys, and having one or more of the inner three columns consist partially or entirely of minimal travel keys. Furthermore, each of the minimal travel keys could be adjacent to one or more of the full travel keys. In FIG. 2B, the minimal travel keys are labeled F1-F8, but it should be understood that such minimal travel keys could be labeled to denote the function(s) they perform, such as any of the functions discussed previously, as shown in FIG. 2C. FIG. 2D illustrates that embodiments of hybrid keypads do not need to have four rows or five columns, and that any number of columns or rows may be employed in a hybrid keypad, as desired. However, it is desirable to consistently use the same arrangement of full-travel and minimal travel keys in keypads so as to reduce the expense of manufacturing them. It will be understood that any keypads referred to subsequently may have one or more of the features of keypads described in reference to FIGS. 2A-2D and keypad 20c above.

Further details of components and functionalities that may be included in the fuel dispenser system 10 are found in U.S. Pat. No. 6,112,981, U.S. Pat. No. 6,321,984, and U.S. Patent Application Publication No. US 2003/0106934 A1, which are hereby incorporated by reference in their entirety.

Listed below are examples of how the fuel dispenser systems described above may be used. It is understood that the functionality described below is interchangeable with different systems, and is not meant to be an exhaustive list.

EXAMPLE A

1. A customer places a card into the reader 22 of fuel dispenser system 10. The card may be a credit card, debit card, or other card sufficient to execute the transaction.
2. Display 20b queries the customer for a personal identification number (PIN). The customer enters the PIN on the full travel keys of keypad 20c and presses the minimal travel key "OK."
3. The keypad 20c sends the PIN data to an encryption device for encryption.
4. After encrypting the data, the encryption device sends the PIN data to controller 26 for processing.
5. The controller 26 receives PIN approval and authorizes the fuel dispenser to dispense fuel.
6. Display 20b queries the customer for a selection of a fuel grade. The customer enters a selection of "Premium" on a minimal travel key of keypad 20c and presses "OK."
7. The customer realizes that a mistake was made and that the "Unleaded" fuel grade should have been selected. The customer presses the minimal travel key "Help."
8. A representative responds to the customer's petition for help and tells the customer to begin a new transaction by pressing the "Cancel" key, which the customer does.
9. The customer decides that fuel is no longer needed and leaves.

EXAMPLE B

1. A customer places a card into the reader 22 of fuel dispenser system 10.
2. Display 20b queries the customer for a personal identification number (PIN). The customer enters the PIN on the full travel keys of keypad 20c and presses the minimal travel key "OK."
3. The keypad 20c sends the PIN data to an encryption device for encryption.
4. After encrypting the data, the encryption device sends the PIN data directly to controller 26 for processing.
5. The controller 26 receives PIN approval and authorizes the fuel dispenser to dispense fuel.
6. The transaction continues according to steps 6-9 of EXAMPLE A.

It should be noted that the examples above are intended to be illustrative rather than limiting. For example, the encryption device could send the PIN data to one or more intermediate locations or devices, including the keypad 20c itself, before the data arrived at controller 26.

The embodiments previously described provide a number of advantages. For example, full-travel numeric keys are useful for deterring a would-be thief from placing a membrane overlay on top of the keypad to capture PIN numbers. Further, the presence of both full-travel keys and customizable minimal travel keys in a keypad deters thieves as above while continuing to allow the keypad to be customized for different companies.

Although illustrative embodiments of the invention have been shown and described, a wide range of modification, changes and substitution is contemplated in the foregoing disclosure. For instance, it is possible to utilize a hybrid keypad in environments other than fuel dispenser systems, such as at carwash facilities, cash registers, devices associated with financial transactions, and point of sale transaction devices more generally. In such environments, the keypad could continue to be connected to a controller and could continue to provide encryption capabilities as described previously, the main difference being that the controller would control a device other than a fuel dispenser system (such as a carwash, cash register, financial transaction device, or point-of-sale transaction device). In an alternative embodiment, a separate system, such as a kiosk, may be provided to interface with one or more conventional fuel dispensers. The kiosk could include a reader, a display screen, and a keypad similar to the hybrid keypads previously described. The hybrid keypad could be connected to the controller 26, or alternatively connected directly to the computing center 30, in which case the encryption device could act on the keypad entries before the entry data reached the computing center 30.

In certain instances, some features of the present invention may be employed without a corresponding use of the other features. Nevertheless, it will be understood that various modifications may be made without departing from the spirit and scope of the invention. Accordingly, other embodiments are within the scope of the following claims, and it is appropriate that the appended claims be construed broadly and in a manner consistent with the scope of the invention.

What is claimed is:

1. A system for dispensing fuel, comprising:
a controller for selectively causing a nozzle to dispense the fuel;
a keypad connected to the controller, the keypad for receiving at least one keypad entry entered by a user, the keypad comprising a first set of travel keys having a first travel length and a second set of travel keys having a second travel length that is less than the first travel length, wherein the first set of travel keys and the second set of travel keys are arranged in a plurality of rows and a plurality of columns of the keypad, wherein at least one key from the second set is adjacent to at least one key from the first set, and wherein at least one key from the second set of travel keys is disposed in an outermost row and an outermost column of the keypad and at least one key of the first set of travel keys is disposed in an innermost row and an innermost column of the keypad;
an encryption device connected to the first set of travel keys for transmitting a nonnumeric or numerical entry, the encryption device operable to receive and encrypt at least one keypad entry from the first set of travel key so that the at least one keypad entry is received by the controller in an encrypted format after being transmitted by the keypad and encrypted by the encryption device.

2. The system of claim 1, wherein the second set of travel keys comprises at least one membrane key.

3. The system of claim 1, wherein a subset of the first set of travel keys is operable to receive a personal identification number.

4. The system of claim 1, wherein a subset of the second set of travel keys is customized to perform at least one nonnumeric function by placing at least one graphic overlay substantially next to the subset of the second set of travel keys intended to be customized.

5. The system of claim 1, wherein the keypad contains at least one language selection key.

6. The system of claim 1, wherein the keypad comprises at least three columns of keys, wherein each column comprises at least one key.

7. The system of claim 1, wherein the keypad comprises at least one key operable to authorize a step of a transaction and at least one key operable to cancel the transaction.

8. The system of claim 6, wherein at least one keypad entry comprises a selection of a payment option and a selection of a fuel grade.

9. A keypad for a fuel dispenser, comprising:
a first set of full travel keys having a first travel length; and
a second set of minimal travel keys having a second travel length that is less than the first travel length,
wherein the first set of travel keys and the second set of travel keys are arranged in a plurality of rows and a plurality of columns, wherein at least one key from the second set is adjacent to at least one key from the first set, and wherein at least one key from the second set of minimal travel keys is disposed in an outermost row and an outermost column and at least one key of the first set of full travel keys is disposed in an innermost row and an innermost column.

10. The keypad of claim 9, wherein the keypad is configured to connect to an encryption device, the encryption device connected to the first set of travel keys for transmitting a numerical or nonnumeric entry, the encryption device operable to receive an encrypt at least one keypad entry of the first set of travel keys so that the at least one keypad entry is received by the controller in an encrypted format after being transmitted and encrypted by the encryption device.

* * * * *